United States Patent
Kafai et al.

(10) Patent No.: US 10,362,553 B2
(45) Date of Patent: Jul. 23, 2019

(54) DETERMINING LOCATION OF WIRELESS-ENABLED DEVICE

(71) Applicant: ENTIT SOFTWARE LLC, Sunnyvale, CA (US)

(72) Inventors: Mehran Kafai, Palo Alto, CA (US); Le An, Palo Alto, CA (US); Omar Aguilar Macedo, Tlaquepaque (MX)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/578,753

(22) PCT Filed: Jun. 4, 2015

(86) PCT No.: PCT/US2015/034276
§ 371 (c)(1),
(2) Date: Dec. 1, 2017

(87) PCT Pub. No.: WO2016/195696
PCT Pub. Date: Dec. 8, 2016

(65) Prior Publication Data
US 2018/0176878 A1  Jun. 21, 2018

(51) Int. Cl.
*H04W 64/00* (2009.01)
*G01S 5/02* (2010.01)
*G01S 1/02* (2010.01)
*G01C 21/20* (2006.01)

(52) U.S. Cl.
CPC ............ *H04W 64/00* (2013.01); *G01S 1/02* (2013.01); *G01S 5/0252* (2013.01); *G01C 21/206* (2013.01)

(58) Field of Classification Search
CPC ......... H04W 4/043; H04W 64/00; G06K 9/68
See application file for complete search history.

(56) References Cited

U.S. PATENT DOCUMENTS

| | | | |
|---|---|---|---|
| 2004/0167988 A1* | 8/2004 | Rune | H04L 12/4616 709/238 |
| 2008/0139217 A1 | 6/2008 | Alizadeh-Shabdiz et al. | |
| 2011/0117924 A1* | 5/2011 | Brunner | G01S 5/0252 455/456.1 |
| 2012/0191512 A1 | 7/2012 | Wuoti et al. | |
| 2012/0286997 A1 | 11/2012 | Lin et al. | |
| 2013/0077873 A1* | 3/2013 | Bar Hillel | G06K 9/68 382/218 |

(Continued)

OTHER PUBLICATIONS

"Cat Tracking Using Bluetooth Indoor Positioning", May 16, 2014; 4 pages.

(Continued)

*Primary Examiner* — Myron Wyche (57) ABSTRACT

An example method is provided in according with one implementation of the present disclosure. The method comprises generating a base image representing a location of a wireless-enabled device with data from a plurality of wireless beacons and generating an image fingerprint for the location of the wireless-enabled device by using the base image. The method further comprises comparing the image fingerprint for the location of the wireless-enabled device with a plurality of existing image fingerprints associated with the plurality of wireless beacons, and determining a location of the wireless-enabled device based on the comparison.

15 Claims, 5 Drawing Sheets

(56) References Cited

U.S. PATENT DOCUMENTS

| | | | |
|---|---|---|---|
| 2013/0143603 A1* | 6/2013 | DiAcetis | H04W 4/043 |
| | | | 455/456.6 |
| 2014/0087752 A1 | 3/2014 | Zhu et al. | |
| 2014/0236476 A1 | 8/2014 | Khorashadi et al. | |
| 2015/0065178 A1 | 3/2015 | Beauregard et al. | |
| 2015/0348248 A1* | 12/2015 | Shibata | G06T 5/003 |
| | | | 382/260 |

OTHER PUBLICATIONS

Perez Iglesias, et al.; "Indoor person localization system through RSSI Bluetooth fingerprinting"; Apr. 11-13, 2012; 4 pages.

International Searching Authority., International Search Report and Written Opinion for PCT Application No. PCT/US2015/034276 Filed Jun. 4, 2015, 12 pages.

Bekkelien, Anja; "Bluetooth Indoor Positioning", Master's Thesis; University of Geneva, Mar. 2012; 56 pages.

Diaz, Javier; "Bluepass: an Indoor Bluetooth-based Localization System for Mobile Applications"; IEEE Symposium on Computers and Communications (ISCC), 2010; pp. 778-783, 6 pages.

Lee, Sangwoo; "Range-Free Indoor Positioning System Using Smartphone with Bluetooth Capability"; Position, Location and Navigation Symposium; 978-1-4799-3320-4/14 IEEE, 2014; pp. 657-662, 6 pages.

Martin, Paul; "Demo Abstract: An iBeacon Primer for Indoor Localization"; ACM Conference on Embedded Systems for Energy Efficient Buildings; , Memphis, TN; Nov. 5-6, 2014; http://dx.doi.org/10.1145/2674061.2675028; pp. 190-191; 2 pages.

Pei, Ling; "Using Inquiry-based Bluetooth RSSI Probability Distributions for Indoor Positioning"; Journal of Global Positioning Systems, vol. 9, No. 2:122-130, DOI:10.5081/jgps.9.2.122; 2010; pp. 122-130, 9 pages.

Subhan, Fazli; "Indoor positioning in Bluetooth networks using fingerprinting and lateration approach," International Conference on Information Science and Applications (ICISA), 2011; 9 pages.

Zhu, Lingling; "Survey of Indoor Positioning Technologies and Systems"; LSMS/ICSEEE 2014, Part I, Communications in Computer and Information Science, vol. 461; pp. 400-409, 10 pages.

Pei, Ling; "Inquiry-based Bluetooth Indoor Positioning via RSSI Probability Distributions"; Second International Conference on Advances in Satellite and Space Communications; DOI 10.1109/SPACOMM.2010.18; IEEE; pp. 151-156, 6 pages.

* cited by examiner

DETERMINING LOCATION OF WIRELESS-ENABLED DEVICE

BACKGROUND

Location based services and positioning systems may be used to locate a person or an object in a particular area. Such positioning services and systems have been widely used in recent years.

DETAILED DESCRIPTION OF SPECIFIC EXAMPLES

As mentioned above, location based services have become increasingly popular in recent years. Specifically, indoor localization or positioning systems that are tasked with locating a person or an object in an indoor area (e.g., a building, etc.) have gained much attention. Due to the fact that people spend most of their time indoors (e.g., office, school, home, mall, etc.), indoor positioning may be useful for many different applications/services such as smart building monitoring, assets tracking, surveillance, advertising, event management, etc.

Further, due to the rapid growth of mobile technologies, localization systems may interact with mobile devices and may adopt different techniques that use the technical capabilities provided by the mobile devices to determine location of a mobile device. However, existing positioning systems and methods may require user input, may be slow and inaccurate, and may create privacy concerns.

In this regard, according to examples, techniques for determining a location of a wireless-enabled device via an image fingerprint are described herein. In one example, the proposed techniques utilize computer vision image features of an image representation of wirelessly (e.g., Bluetooth) transmitted measurements (e.g., received signal strength indicator (RSSI)) for the purpose of indoor positioning of a wireless-enabled device (e.g., cell phone, tablet, tag, wearable, etc.). The proposed techniques efficiently transform a wireless (e.g., Bluetooth) indoor positioning problem into an image classification problem. The techniques described herein may create a base image from the RSSI measurements received from multiple wireless beacons. As used herein, the term "base image" refers to a grayscale image of normalized RSSI values from multiple wireless beacons. Thereafter, image-specific features are extracted from the base image to generate an image fingerprint for the location of a wireless-enabled device. As used herein, the term "image fingerprint" refers to an image array where each page of the array corresponds to a specific feature descriptor transformation of the base image. Image classification is performed on the image fingerprint, which results in the positioning of the wireless-enabled device when the image fingerprint is matched with an existing image fingerprints associated with one of the plurality of wireless beacons.

In one example, a processor may generate a base image representing the location of a wireless-enabled device with data from a plurality of wireless beacons. The processor may further generate an image fingerprint for the location of the wireless-enabled device by using the base image and may compare the image fingerprint for the location of the wireless-enabled device with a plurality of existing image fingerprints associated with the plurality of wireless beacons. Finally, the processor may determine the location of the wireless-enabled device based on the comparison.

Thus, the proposed techniques "transform" an object positioning scenario into an image classification/categorization scenario. Therefore, the approach described herein makes possible to apply various computer vision based solutions to perform positioning more efficiently and accurately through the analysis of a novel image representation of the wireless (e.g., Bluetooth) signals from a plurality of beacons.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Figure 1:
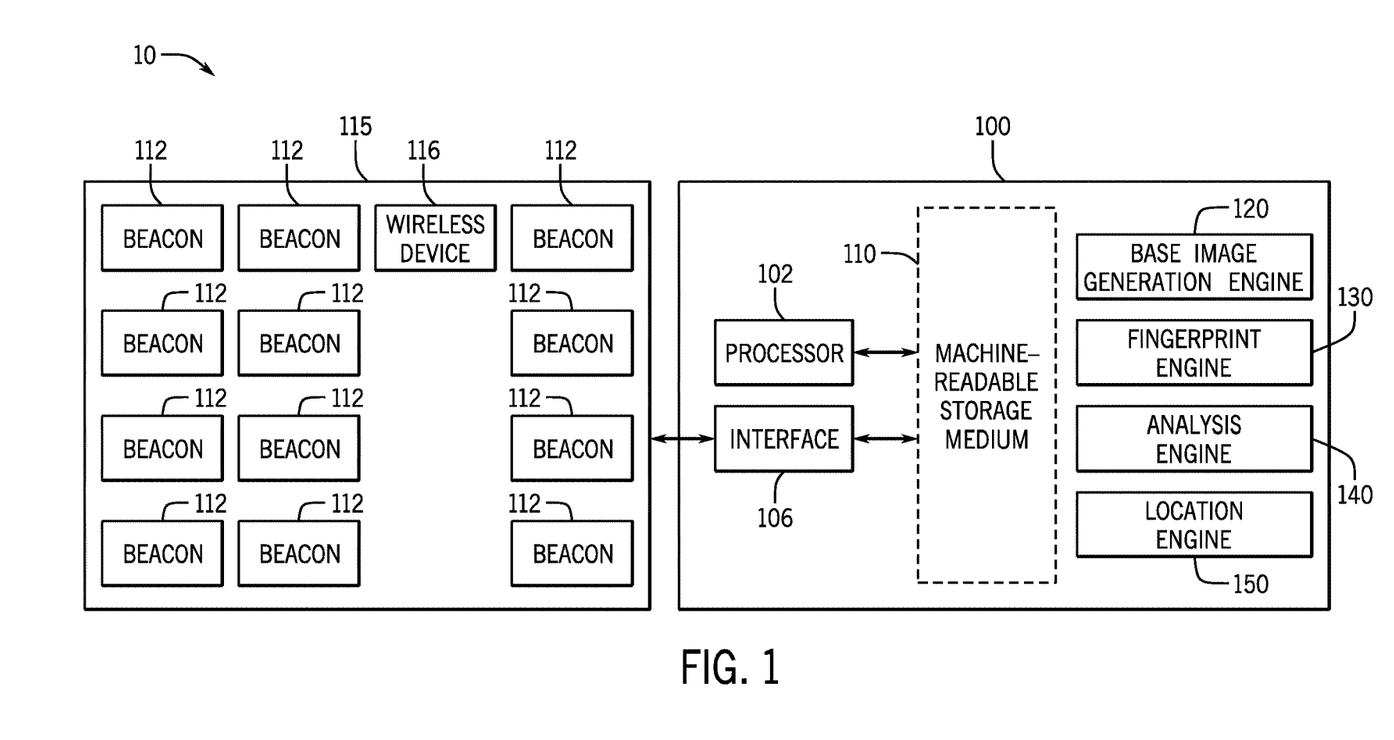
FIG. 1 is a schematic illustration of an example system for determining a location of a wireless-enabled device in accordance with an implementation of the present disclosure.

Referring now to the figures, FIG. 1 is a schematic illustration of an example system 10 for determining a location of a wireless-enabled device. The illustrated system 10 is capable of carrying out the techniques described below. As shown in FIG. 1, the system 10 is depicted as including at least one a computing device 100. In the embodiment of FIG. 1, computing device 100 includes a processor 102, an interface 106, and a machine-readable storage medium 110. Although only computing device 100 is described in details below, the techniques described herein may be performed with several computing devices or by engines distributed on different devices.

The computing device 100 (or another computing device) may communicate with a plurality of wireless (e.g., Bluetooth) beacons 112 positioned in at least one defined area 115 to generate a plurality of image fingerprints associated with the plurality of wireless beacons 112 (i.e., each image fingerprint corresponds to the location of a beacon). As used herein, the term "wireless beacon" refers to any type of wireless transmitter/receiver that is capable of transmitting/receiving and processing wireless signals. In other examples, the system 10 may include multiple computing devices and multiple defined areas 115. As used herein, the term "defined area" refers to an area with defined boundaries. Examples of such defined area include but are not limited to: office buildings, schools, houses, apartment buildings, malls/stores, convention centers, amusement parks, courtyards, parking lots, academic campuses, and any combinations thereof. The defined boundaries may be physical (e.g., wall, fence, etc.) or an arbitrary boundary defined by a map or other representation.

The number of wireless beacons 112 shown in FIG. 1 is intended to be an example. In one implementation, the beacons 112 may be placed such that each perimeter beacon has at least two neighbor beacons and each inner beacon has four neighbors. The defined area 115 may include any number of wireless beacons 112. In one example, the wireless beacons 112 in a defined area 115 may receive signals from a wireless-enabled device 116) and may communicate the signals to a server (e.g., computing device 100, etc.) to process the signals and to determine the location of the wireless-enabled device by using the techniques described herein. For example, the wireless beacons 112 may include, Bluetooth beacons, Wi-Fi/WLAN beacons, Wi-Fi base beacons, etc.

The computing device 100 may be any type of a computing device and may include at least engines 120-150. In one implementation, the computing device 100 may be an independent computing device. In another implementation, the computing device 100 may be the wireless-enabled device which position is being determined using the techniques described below. Engines 120-150 may or may not be part of the machine-readable storage medium 110. In another alternative example, engines 120-150 may be distributed between the computing device 100 and others computing devices. The computing device 100 may include additional components and some of the components depicted therein may be removed and/or modified without departing from a scope of the system that allows for carrying out the functionality described herein. It is to be understood that the operations described as being performed by the engines 120-150 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) interface, an external Serial Advanced Technology Attachment (eSATA) interface, or any other physical connection interface suitable for communication with the computing device. Alternatively, Interface 106 may be a wireless interface, such as a wireless local area network (WLAN) interface or a near-field communication (NFC) interface that is used to connect with other devices/systems and/or to a network. The beacons 112 in the defined area 115 and the computing device 100 may be connected via a network. In one example, the network may be a mesh sensor network (not shown). The network may include any suitable type or configuration of network to allow for communication between the computing device 100, beacons 112, and any other devices/systems (e.g., other computing devices, displays, etc.), for example, to send and receive data to and from a corresponding interface of another device.

Each of the engines 120-150 may include, for example, at least one hardware device including electronic circuitry for implementing the functionality described below, such as control logic and/or memory. In addition or as an alternative, the engines 120-150 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code (e.g., computer executable instructions), hardware, firmware, and/or logic, or combination thereof to perform particular actions, tasks, and functions described in more detail herein in reference to FIGS. 2-5.

In one example, the base image generation engine 120 may generate a base image representing a location of a wireless-enabled device with data from a plurality of wireless beacons (e.g., beacons 112 in the area 115). In some implementations, the engine 120 may receive signal strength indicator data (e.g., RSSI values) from each of the plurality of wireless beacons over a period of time. In one example, the engine 120 may place a virtual grid on the plurality of wireless beacons 112 so each beacon represents one grid cell and may generate a base image for each of the plurality of wireless beacons. Thus, the base image is a grayscale image of normalized RSSI values where each grid cell is identified as a pixel in the base image.

The fingerprint engine 130 may generate an image fingerprint for the location of the wireless-enabled device by using the base image. In one example, the fingerprint engine 130 may extract image-specific features from the base image and may generate an image fingerprint for each grid cell. Thus, each image fingerprint is an array where each page of the array corresponds to a specific feature descriptor transformation of the base image. Various techniques may be used to generate an image fingerprint. Examples of specific techniques are described in more details below. Further, the fingerprint engine may 130 may generate a gallery of image fingerprints for each of the plurality of corresponding cells (i.e., corresponding to beacon 112 location), where each cell may be associated with more than one image fingerprint corresponding to a different feature descriptor. In other words, each beacon 112 may be represented by a different image fingerprints that depend on the different feature descriptors.

The analysis engine 140 may compare the image fingerprint for the location of the wireless-enabled device with a plurality of existing image fingerprints associated with the plurality of wireless beacons. In one example, the analysis engine 140 may compare the image fingerprint for the location of the wireless-enabled device with the previously generated gallery of image fingerprints for each of the plurality of corresponding cells/beacon locations.

The location engine 150 may determine the location of the wireless-enabled device based on the comparison between the image fingerprint for the location of the wireless-enabled device with the plurality of existing image fingerprints associated with the plurality of wireless beacons. In some examples, the location engine 150 may determine the location of the wireless-enabled device is by using image classification techniques based on image-specific features of the image fingerprints. Examples of specific image classification techniques are described in more details below.

Figure 2:
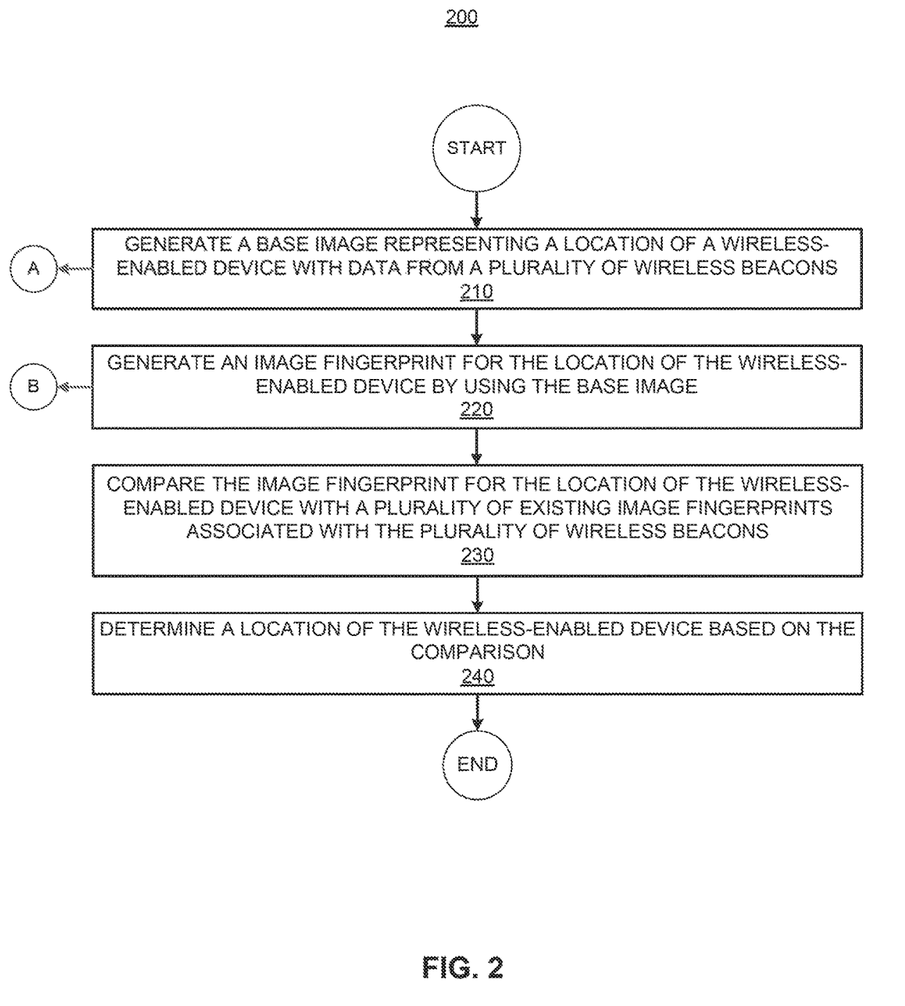
FIG. 2 illustrates a flowchart showing an example of a method for determining the location of a wireless-enabled device in accordance with an implementation of the present disclosure.

FIG. 2 illustrates a flowchart showing an example of a method 200 for determining the location of a wireless-enabled device. Although execution of the method 200 is described below with reference to the system 10, the components for executing the method 200 may be spread among multiple devices/systems. The method 200 may be implemented in the form of executable instructions stored on a machine-readable storage medium, and/or in the form of electronic circuitry.

In one example, the method 200 can be executed by at least one processor of a computing device (e.g., processor 102 of device 100). In other examples, the method may be executed by another processor in communication with the system 10. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples.

The method 200 begins at 210, where at least one processor may generate a base image representing a location of a wireless-enabled device with data from a plurality of wireless beacons. In one example, the wireless-enabled device may be a mobile device (e.g., smart phone, tablet, etc.) carried by a user that entered a defined area 115. As noted above, the base image may be a grayscale image of normalized RSSI values. The process for generating a base image for a wireless-enabled device is described in additional details in relation to FIG. 3.

At 220, the processor may generate an image fingerprint for the location of the wireless-enabled device by using the base image. In one implementation, the processor may extract image-specific features from the base image and may generate an image fingerprint for each grid cell of the base image. Thus, each image fingerprint may be represented as an array where each page of the array corresponds to a specific feature descriptor transformation of the base image. Example techniques for generating an image fingerprint (for the wireless-enabled device, for the gallery of image fingerprints for a defined area 115) is described in additional details in relation to FIG. 4. The techniques described in FIG. 4 may be further applied to a process that generates a gallery of image fingerprints for each of the plurality of corresponding cells (i.e., corresponding to beacon locations) of the defined area 115. In the generated gallery, each cell may be associated with more than one image fingerprint corresponding to a different feature descriptor.

At 230, the processor may compare the image fingerprint for the location of the wireless-enabled device with a plurality of existing image fingerprints associated with the plurality of wireless beacons. In other words, the processor may perform image matching to determine whether the image fingerprint for the location of the wireless-enabled device matches with one of the previously generated and stored image fingerprints associated with the plurality of wireless beacons (i.e., with their location).

Next, the processor may determine a location of the wireless-enabled device based on the comparison (at 240). In some examples, image classification techniques based on the image-specific features of the image fingerprints may be used to compare the image fingerprint of the wireless-enabled device with the plurality of existing fingerprints. In other words, the processor may use classification techniques based on the image-specific features of the image fingerprints to determine which image in the gallery of image fingerprints is most similar to the image fingerprint of the wireless-enabled device. The location of the stored image fingerprint that is the best match to the image fingerprint of the wireless-enabled device is determined to be the location of the wireless-enabled device. In some implementations, the processor may use Walsh-Hadamard transform hashing to determine the most similar images in the gallery. However, in other implementations, other classification techniques may be used (e.g., k-Nearest Neighbors, support vector machines, etc.). The selected classification technique may depend on the number of base images increased either by generating more than one base image per time period, by increasing the number of beacons, or a combination of both. It may also depend on choosing to handle missing values or not.

Figure 3:
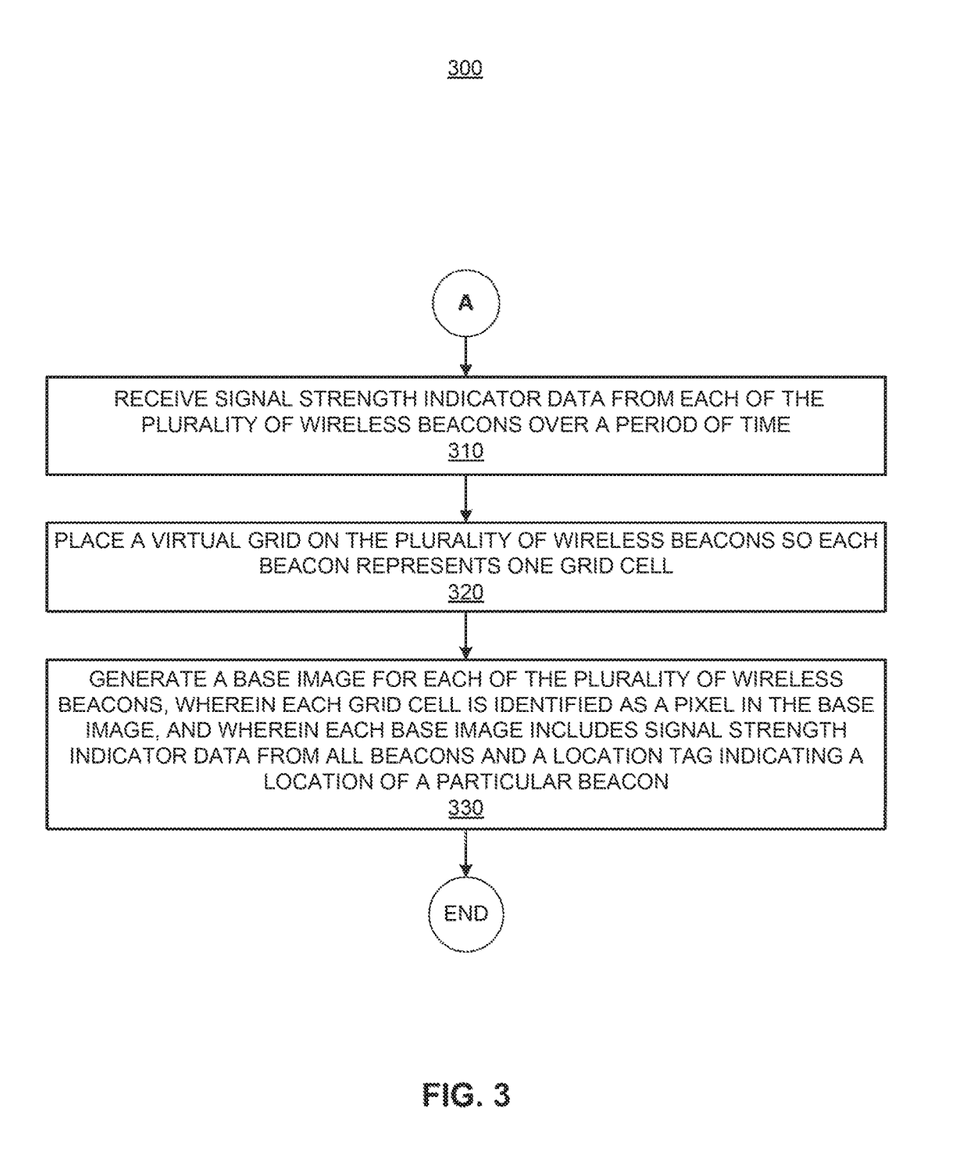
FIG. 3 illustrates a flowchart showing an example of a method for generating a base image in accordance with an implementation of the present disclosure.
Figure 4:
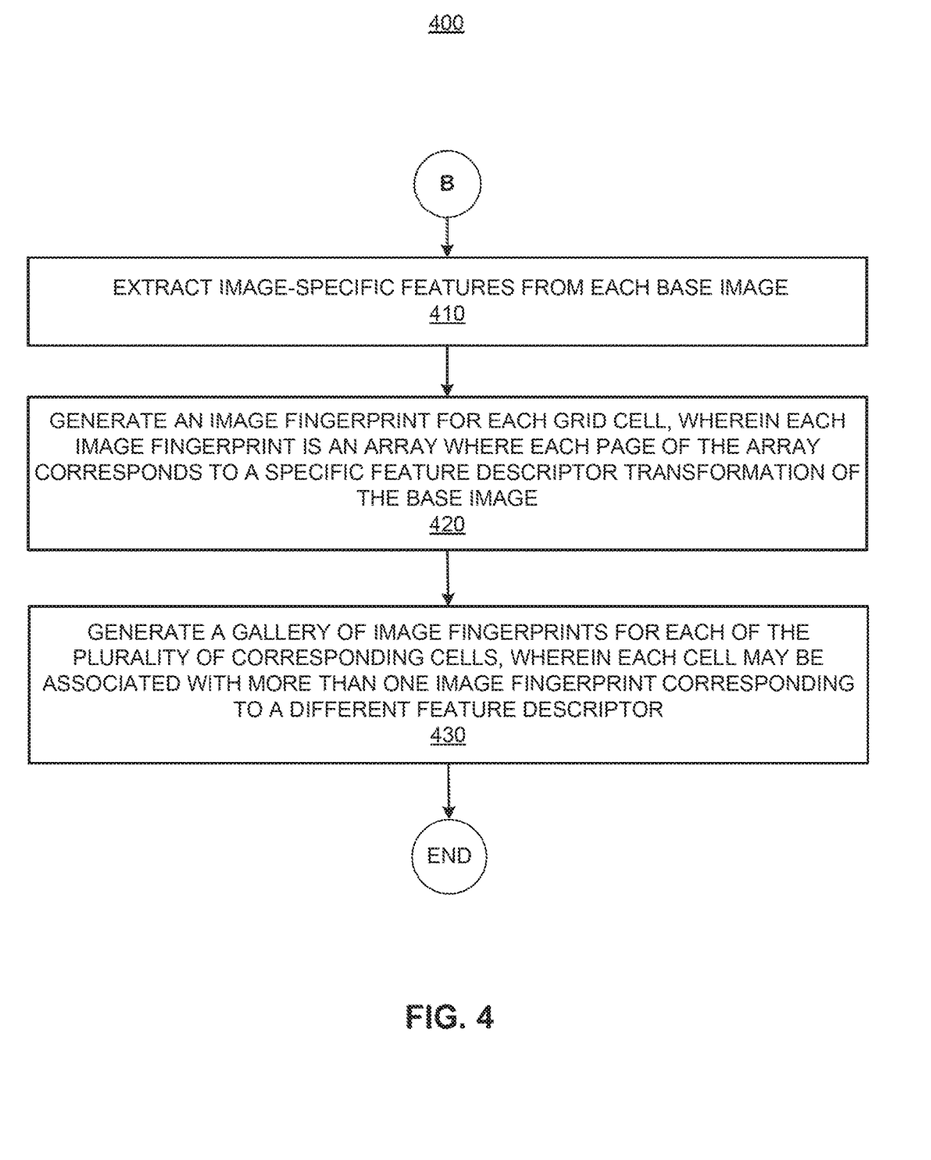
FIG. 4 illustrates a flowchart showing an example of a method for generating an image fingerprint in accordance with an implementation of the present disclosure.

In some examples, the techniques of methods 300 and 400 described below and directed to generating a base image and an image fingerprint may be performed before attempting to position a wireless-enabled device. In other words, a plurality of base images and image fingerprints may be generated for wireless beacons/cells in a defined area by using a wireless-enabled device and a plurality of wireless beacons. The base images and image fingerprints represent the locations of a wireless device at each beacon/cell that are used to generate a gallery of image fingerprints for the defined area. Then, during the actual wireless-enabled device positioning phase (described in FIG. 2), a new base image and an image fingerprint are generated for the unknown location of a wireless-enabled device. The generated image fingerprint is then compared to an image fingerprint of known locations to determine the actual location of the wireless-enabled device.

A method 300 for generating a base image is described in more details in relation to FIG. 3. The method 300 can be executed by at least one processor of a computing device (e.g., processor 102 of device 100). In other examples, the method may be executed by another processor in communication with the system 10. As explained in additional details below, a base image may be generated with data from a plurality of wireless beacons to represent the location of a wireless-enabled device that is to be positioned via the method 200. In addition, base images may be generated for each of the plurality of wireless beacons when a gallery of image fingerprints is created for a defined area 115.

The method 300 begins at 310, where the processor may receive signal strength indicator data (e.g., RSSI values) from each of the plurality of wireless beacons over a period of time. In other words, the processor may collect RSSI data from each of a plurality of beacons 112 in a defined area 115. In this example implementations, the wireless beacons may retrieve information from a wireless-enabled device and the data may be communicated to a server (e.g., device 100) to perform the positioning. In other example implementations, the positioning may be performed on the wireless-enabled device.

At 320, the processor may place a virtual grid on the plurality of wireless beacons so each beacon represents one grid cell. In other words, the location of each beacon 112 in the defined area 115 is defined by a grid cell. As further noted below, each cell in the virtual grid is later identified as a pixel in the base image representation of plurality of beacons 112 (i.e., the defined area 115). Thus, the result of the signal strength indicator data capture process may be a multi-dimensional array (e.g., 3D), where the numbers of rows and columns correspond to the layout of wireless beacons, and the number of pages (i.e., 3rd dimension) corresponds to time. Each page may include missing values as the process is asynchronous. Each page may be extracted as a 2D array, or a statistic (e.g., mean) may be used to collapse the entire 3D array into one 2D array. An example would be to compute the mean for each cell over all pages, ignoring the missing values.

Next, the processor may generate a base image for each of the plurality of wireless beacons, where each grid cell is identified as a pixel in the base image (at 330). In one example, each base image includes signal strength indicator data from all beacons and a location tag indicating the location of a particular beacon. Thus, the 2D array may be depicted as a grayscale image, which is identified as the base image after cell values are normalized. In other words, each base image is a grayscale image of normalized RSSI values that indicates the location of a particular wireless beacon in a defined area. As noted above, the base image for each is may be used to generate an image fingerprint for that cell.

FIG. 4 illustrates a flowchart showing an example of a method 400 for generating an image fingerprint. The method 400 can be executed by at least one processor of a computing device (e.g., processor 102 of device 100). In other examples, the method may be executed by another processor in communication with the system 10. As explained in additional details below, an image fingerprint may be generated for the location of the wireless-enabled device that is to be positioned via the method 200. In addition, image fingerprints may be generated for each of the plurality of wireless beacons/cells of the grid (i.e., to identify their location) when a gallery of image fingerprints is created for a defined area 115.

The method 400 begins at 410 where the processor may extract image-specific features from each base image. In other words, each base image from the plurality of base images for the wireless beacons in a defined area may provide image-specific features to a processor. In the alternative, the processor may extract image-specific features form the base image of the location of a wireless-enabled device that is to be positioned. In one example, the image-specific features include at least one of: local binary patterns (LBP), local phase quantization (LPQ), and histogram of gradients (HOG). LBP and LPQ are texture descriptors commonly used in computer vision applications. HOG descriptors utilize the distribution of intensity gradients for several computer vision applications such as object detection. The main idea behind using such computer vision descriptors is to model the spatial relationship between RSSI values as image texture and/or intensity gradients. In other examples, other image-specific features may be used.

At 420, the processor may generate an image fingerprint for each grid cell. Each image fingerprint may be an array where each page of the array corresponds to a specific feature descriptor transformation of the base image. In other words, multiple image fingerprints may be generated for each grid cell/wireless beacon depending on the different feature descriptor transformations (e.g., LBP, LPQ, HOG, etc.) of the base image for the grid cell.

At 430, the processor may generate a gallery of image fingerprints for each of the plurality of corresponding cells, where each cell may be associated with more than one image fingerprint corresponding to a different feature descriptor. Thus, the result of the image fingerprint capturing/generation stage is a gallery of image fingerprints labelled with their corresponding cells (i.e., beacon locations), one or more image fingerprints per cell. In the situation where the processor is to position a wireless-enabled device, the result of this stage is an image fingerprint for the unknown location of the wireless-enabled device.

Figure 5:
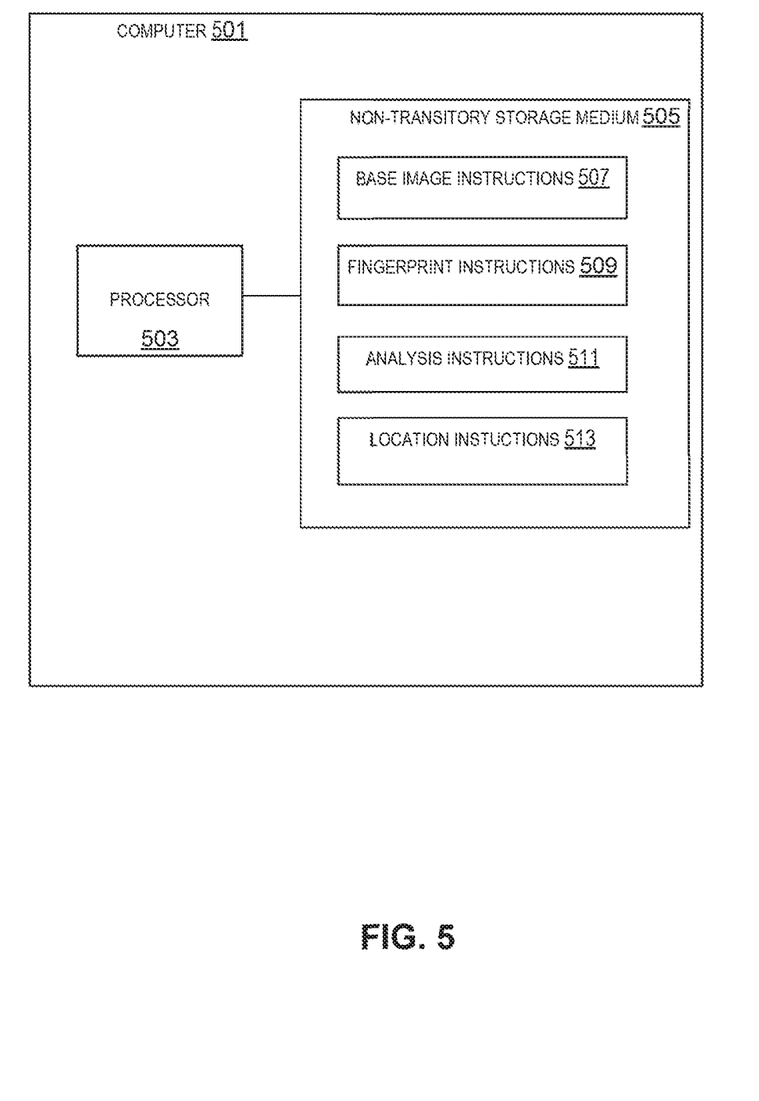
FIG. 5 is an example block diagram illustrating a computer-readable medium in accordance with an implementation of the present disclosure.

FIG. 5 illustrates a computer 501 and a non-transitory machine-readable medium 505 according to an example. In one example, the computer 501 maybe similar to the computing device 100 of the system 10 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.).

Computer 501 may perform methods 200-400 and variations thereof. Additionally, the functionality implemented by computer 501 may be part of a larger software platform, system, application, or the like. Computer 501 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 501 may include a processor 503 and non-transitory machine-readable storage medium 505. The processor 503 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 305 may be operatively coupled to a bus. Processor 503 can include single or multiple cores on a chip, multiple cores across multiple chips, multiple cores across multiple devices, or combinations thereof.

The storage medium 505 may include any suitable type, number, and configuration of volatile or non-volatile machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage media 505 and executed by the processor 503 includes, for example, firmware, applications, program data, filters, rules, program modules, and other executable instructions. The processor 503 retrieves from the machine-readable storage media 505 and executes, among other things, instructions related to the control processes and methods described herein.

The processor 503 may fetch, decode, and execute instructions 507-513 among others, to implement various processing. As an alternative or in addition to retrieving and executing instructions, processor 503 may include at least one integrated circuit (IC), other control logic, other electronic circuits, or combinations thereof that include a number of electronic components for performing the functionality of instructions 507-513. Accordingly, processor 503 may be implemented across multiple processing units and instructions 507-513 may be implemented by different processing units in different areas of computer 501.

The instructions 507-513 when executed by processor 503 (e.g., via one processing element or multiple processing elements of the processor) can cause processor 503 to perform processes, for example, methods 200-400, and/or variations and portions thereof. In other examples, the execution of these and other methods may be distributed between the processor 503 and other processors in communication with the processor 503.

For example, base image instructions 507 may cause processor 503 to generate a base image representing the location of a wireless-enabled device with data from a plurality of wireless beacon. In some implementations, a base image includes signal strength indicator data from all beacons and a location tag indicating a location of a particular beacon. Further, these instructions may cause processor 503 to generate a base image for each of the plurality of wireless beacons in a defined area. These instructions may function similarly to the techniques described in block 210 of method 200 and in method 300.

Fingerprint instructions 509 may cause the processor 503 to generate an image fingerprint for the location of a wireless-enabled device by using the base image. In some examples, instructions 509 may cause the processor to extract image-specific features from the base image and to generate an image fingerprint for each grid cell in a defined area. Further, instructions 509 may cause the processor to generate a gallery of image fingerprints for each of the plurality of corresponding cells, where each cell may be associated with more than one image fingerprint corresponding to a different feature descriptor. These instructions may function similarly to the techniques described in block 220 of method 200 and in method 400.

Analysis instructions 511 may cause the processor 503 to compare the image fingerprint for the location of a wireless-enabled device with a plurality of existing image fingerprints associated with the plurality of wireless beacons. These instructions may function similarly to the techniques described in block 230 of method 200.

Location instructions 513 may cause the processor 503 to determine, by using image classification techniques based on image-specific features of the image fingerprints, the location of a wireless-enabled device based on the comparison. These instructions may function similarly to the techniques described block 240 of method 200. Thus, location instructions 513 may cause the processor 503 to determine which image in the gallery of image fingerprints is most similar to the image fingerprint of the wireless-enabled device. That way, the processor may determine the location of the wireless-enabled device.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by at least one processor:
generating, based on data received from a plurality of wireless beacons, a base image associated with a location of a wireless-enabled device and representing signal strengths associated with the plurality of wireless beacons;
processing the base image to generate an image fingerprint corresponding to the base image and being associated with the location of the wireless-enabled device;
comparing the image fingerprint with a plurality of existing image fingerprints associated with the plurality of wireless beacons; and
determining the location of the wireless-enabled device based on the comparison.

2. The method of claim 1, wherein the location of the wireless-enabled device is determined by using image classification techniques based on image-specific features of the image fingerprints.

3. The method of claim 1, further comprising, by at least one processor:
receiving signal strength indicator data from each of the plurality of wireless beacons over a period of time;
placing a virtual grid on the plurality of wireless beacons so each beacon represents one grid cell; and
generating a base image for each of the plurality of wireless beacons, wherein each grid cell is identified as a pixel in the base image.

4. The method of claim 3, wherein each base image includes signal strength indicator data from all beacons and a location tag indicating a location of a particular beacon.

5. The method of claim 3, further comprising, by at least one processor:
extracting image-specific features from each base image; and
generating an image fingerprint for each grid cell.

6. The method of claim 5, wherein the image-specific features include at least one of: local binary patterns (LBP), local phase quantization (LPQ), and histogram of gradients (HOG).

7. The method of claim 5, wherein each image fingerprint is an array where each page of the array corresponds to a specific feature descriptor transformation of the base image.

8. The method of claim 5, further comprising, by at least one processor: generating a gallery of image fingerprints for each of the plurality of corresponding cells, wherein each cell may be associated with more than one image fingerprint corresponding to a different feature descriptor.

9. The method of claim 1, wherein the wireless beacons are Bluetooth beacons and wherein the beacons are placed such that each perimeter beacon has at least two neighbor beacons and each inner beacon has four neighbors.

10. A system comprising:
at least one processor; and
a memory to store instructions that, when executed by the at least one processor, cause the at least one processor to:
generate, based on data received from a plurality of wireless beacons, a base image associated with a location of a wireless-enabled device and representing signal strengths associated with the plurality of wireless beacons;
process the base image to generate an image fingerprint corresponding to the base image and being associated with the location of the wireless-enabled device;
compare the image fingerprint with a plurality of existing image fingerprints associated with the plurality of wireless beacons; and
determine the location of the wireless-enabled device based on the comparison, including determining the location of the wireless-enabled device by using image classification techniques based on image-specific features of the image fingerprints.

11. The system of claim 10, wherein the instructions, when executed by the at least one processor, cause the at least one processor to:
- receive signal strength indicator data from each of the plurality of wireless beacons over a period of time;
- place a virtual grid on the plurality of wireless beacons so each beacon represents one grid cell; and
- generate a base image for each of the plurality of wireless beacons, wherein each grid cell is identified as a pixel in the base image.

12. The system of claim 11, wherein the instructions, when executed by the at least one processor, cause the at least one processor to:
- extract image-specific features from each base image;
- generate an image fingerprint for each grid cell; and
- generate a gallery of image fingerprints for each of the plurality of corresponding cells, where each cell may be associated with more than one image fingerprint corresponding to a different feature descriptor.

13. A non-transitory machine-readable storage medium encoded with instructions executable by at least one processor, the machine-readable storage medium comprising instructions to:
- generate, based on data received from a plurality of wireless beacons, a base image associated with a location of a wireless-enabled device, wherein the base image represents a signal strength associated with each wireless beacon of the plurality of wireless beacons, and the base image is associated with a location tag representing a location of a particular wireless beacon of the plurality of wireless beacons;
- process the base image to generate an image fingerprint corresponding to the base image and being associated with the location of the wireless-enabled device;
- compare the image fingerprint with a plurality of existing image fingerprints associated with the plurality of wireless beacons; and
- determine, by using image classification techniques based on image-specific features of the image fingerprints, the location of the wireless-enabled device based on the comparison.

14. The non-transitory machine-readable storage medium of claim 13, further comprising instructions to:
- receive signal strength indicator data from each of the plurality of wireless beacons over a period of time;
- place a virtual grid on the plurality of wireless beacons so each beacon represents one grid cell; and
- generate a base image for each of the plurality of wireless beacons, wherein each grid cell is identified as a pixel in the base image.

15. The non-transitory machine-readable storage medium of claim 13, further comprising instructions to: extract image-specific features from each base image to generate an image fingerprint for each grid cell.

* * * * *